C. R. KEAGLE.
MOWING MACHINE.
APPLICATION FILED APR. 26, 1920.
1,425,489.
Patented Aug. 8, 1922.
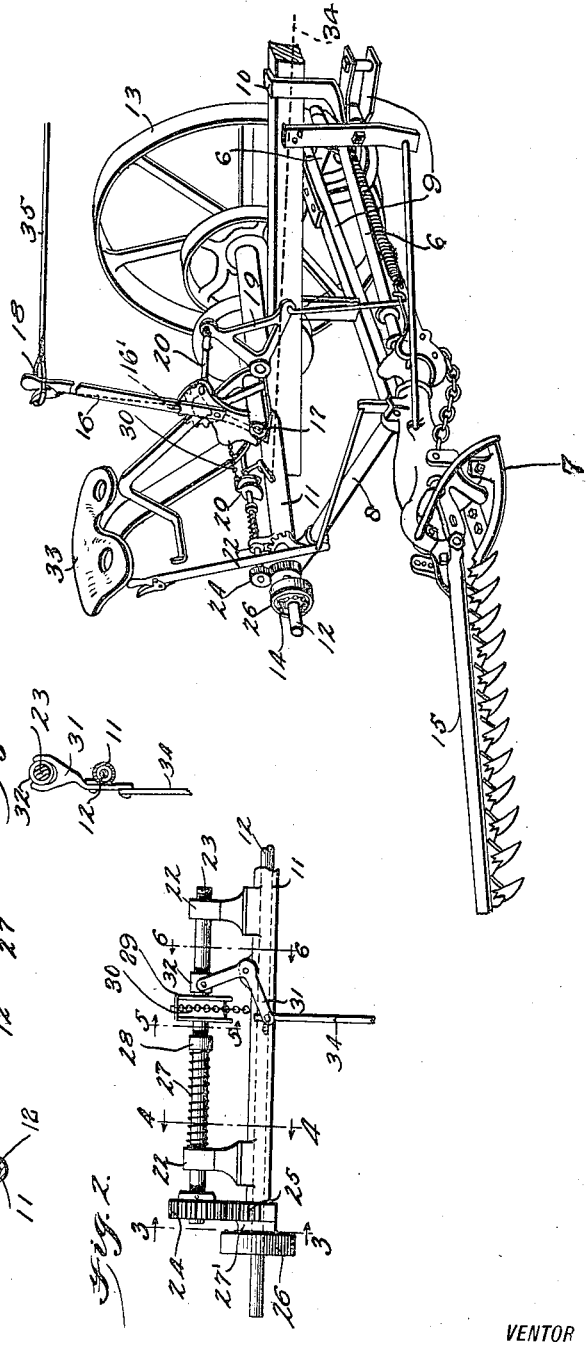
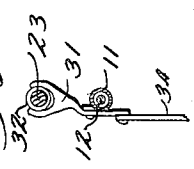
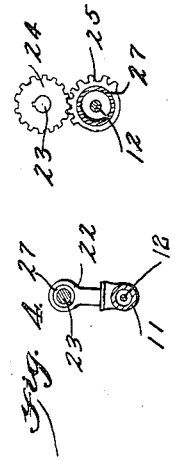
WITNESSES
INVENTOR
C. R. Keagle,
BY
ATTORNEYS

UNITED STATES PATENT OFFICE.

CHARLES ROBERT KEAGLE, OF JOLIET, ILLINOIS.

MOWING MACHINE.

1,425,489.   Specification of Letters Patent.   Patented Aug. 8, 1922.

Application filed April 26, 1920. Serial No. 376,738.

*To all whom it may concern:*

Be it known that I, CHARLES ROBERT KEAGLE, a citizen of the United States, and a resident of Joliet, in the county of Will and State of Illinois, have invented certain new and useful Improvements in Mowing Machines, of which the following is a specification.

My invention has relation to the class of harvesters and more particularly to mowing machines, and it comprehends an improved power operated means for lifting the cutter bar of the machine to a vertical or inoperative position, whereby to obviate the necessity of lifting the same by hand.

The invention further comprehends the provision of a power operated means for lifting the cutter bar of a mowing machine for the above purpose, and it is so constructed as to be operated by power derived from the drive wheels of the machine and which may be operated or controlled by one foot of the operator when the mowing machine is advanced by horses or other draft animals, and which will permit the operation thereof by a single operator on a tractor employed for advancing the mower, instead of necessitating the employment of two men, one of whose services is required on the mower and the other on the tractor.

Other objects and advantages of the invention will become apparent during the course of the following description.

In the drawings:

Figure 1 is a perspective view of a mowing machine having one wheel removed and showing the improved power device for lifting the cutter bar, Figure 2 is an enlarged fragmentary plan view of the power device, Figure 3 is a sectional view taken on the line 3—3 of Figure 2, Figure 4 is a sectional view taken on the line 4—4 of Figure 2, Figure 5 is a sectional view taken on the line 5—5 of Figure 2, and Figure 6 is a sectional view taken on the line 6—6 of Figure 2.

Referring to the drawings in detail, there is shown a mowing machine of the type having a side cutter bar with a front cut and axial drive, and it embodies a pole or tongue 10 at the rear end of which is arranged a housing 11 having a rotating axle or shaft 12, on the ends of which drive wheels 13 are mounted and adapted to transmit rotation to the shaft in one direction through the medium of a ratchet connection 14 with each hub. The cutter bar is designated at 15, and is pivotally supported in the usual or any preferred manner, to be lifted or raised to a vertical or inoperative position, or to be lowered to an operative position as will be later described. As illustrated the cutter bar mechanism is driven from the power axle through suitable drive connections 6, the inner end of the sickle or cutter bar being pivoted on the floating inner shoe 7 through which the connection is made, while the shoe and drive connections are supported by the brace 8 and the brace and coupling frame 9.

The ordinary means for manually raising or lifting the cutter bar to a vertical position and lowering the cutter bar consists of a throw lever 16 pivoted at 17 and having a latch 18 by which it may be held in an adjusted position, the lever being connected by the rocking lever 19 and the links 20—21 with the cutter bar or supporting device thereof, so that the cutter bar may be operated.

It is to be understood that while I have described one form of mowing machine and which so far as at present appears, may be assumed to be the preferred form, yet I desire to have it understood that this form is merely illustrative.

As one form of power operated means for lifting or raising the cutter bar, the housing 11 is arranged with bearings 22 rotatably supporting a counter-shaft 23 on one end of which is fixed a pinion 24 adapted to intermittently mesh with a segmental pinion or mutilated gear 25 having its hub secured to or formed integral with the hub 26 of the ratchet device of one of the drive wheels, as shown at 27'.

The pinion 24 is normally held disengaged from the pinion 25 as through the medium of an expansible helical spring 27 coiled on the counter-shaft and disposed between one of the bearings 22 and a fixed collar 28 so as to shift the counter-shaft longitudinally toward the right in Figures 1 and 2 of the drawing, whereby the power operated drive device is normally inoperative.

Connection between the counter-shaft and the throw lever 16 is effected through the medium of a half sheave 29 to one end of which is connected a chain or like flexible connection 30, the other end of which is connected to the throw lever so that when the countershaft is driven and the pinion 24 is in mesh with the mutilated gear or segmental pinion 25, the chain will be wound on the sheave to exert pull on the throw lever and thereby raise the cutter bar to lift it to an inoperative position. In order to shift the countershaft so as to bring the pinions in mesh, as distinguished from their normal position out of mesh, or engagement, a bell crank or foot lever 31 is pivoted on the housing 11 and connected to a collar 32 on the countershaft, the usual shifter lever or fork spanning the collar being employed for this purpose. Obviously, when the machine is being advanced by draft animals, and the operator is reposed on the seat 33, he may actuate the lever 31 by one foot so as to throw the device into operation against the action of the spring 27 whereby the cutter bar may be lifted by power derived from the drive wheels. When it is desired to lower the cutter bar it will drop from its own weight, the pinions having been previously disengaged upon releasing the crank or foot lever and the lowering of the cutter bar may be controlled by the throw lever 16, if desired. When the machine is being drawn by a tractor, a cable or the like 34 is extended from one arm of the lever 31 to a position in convenient relation to the operator of the tractor so that the pinion may be thrown into engagement for lifting the cutter bar or released for automatically disengaging the spring 27.

The latch 16' of the throw lever 16 will automatically hold the cutter bar in any desired position and therefore in order to release the latch, to permit the cutter bar to be lowered to an operative position, a rope or cable 35 is extended from the tractor to the latch handle and throw lever so that the latch may be released and the cutter bar lowered without necessitating that the operator leave his position on the seat of the tractor. Thus by the use of this device or power lift, one man can operate a tractor and a mowing machine, whereas without the power lift, it requires two men to operate a tractor and a mower, one on the mower, and one on the tractor.

It will also be understood that the spring 27 is very weak, but sufficiently strong to shift the shaft 23 so that the pinion or gear 24 will be moved out of engagement with respect to the segmental or mutilated gear 25 which is fixed to the ratchet hub of the adjacent wheel of the mower. In this manner, automatic disengagement of the driving means is rendered possible when the cutter bar has been elevated, this automatic disengagement of the drive connection so that the latter is rendered inoperative, being assisted by the fact that only sufficient teeth are provided on the mutilated or segmental gear or pinion 25 to elevate the cutter bar the required height. When this is accomplished, the pinion 24 will strike the smooth portion of the pinion 25 and automatic disconnection will result.

It will also be seen that the device may be operated by power or by hand, but the hand operated device or lever may be omitted if desired, since it is unnecessary to grip and operate the hand lever when the power device is in use.

In view of the foregoing, it is thought that the operation of the device will be readily understood, and in view of its simplicity and practical value, that it will readily commend itself to those skilled in the art.

Having thus particularly described and ascertained the nature of the invention, and in what manner the same is to be used, what is claimed is:

1. The combination with a mowing machine having a cutter bar adapted to be raised to an inoperative position; of power operated means for raising said cutter bar and means for releasing said device from a point in advance of and not within reach of an operator of the mower.

2. The combination with a mowing machine having a cutter bar adapted to be raised to an inoperative position; of power operated means for raising said cutter bar, means for holding the cutter bar in raised position and for controlling the lowering thereof, means for operating the same from a point in advance of and not within reach of an operator of the mower, and means for releasing the same from said point.

3. The combination with a mowing machine having the usual drive wheels and a cutter bar pivoted to be lifted to an inoperative position; of a drive device adapted to be operatively connected with the drive wheels, and having connection with the cutter bar to raise the same, means for holding the cutter bar in a raised position, means for releasing said holding means from a point in advance of and not within reach of an operator of the mower, and means for operating the same from a common point.

4. The combination with a mowing machine, a pivoted cutter bar and a throw lever having connection with the cutter bar for raising and lowering the same; of releasable holding means for said throw lever, a normally inoperative power device on the mowing machine having connection with the lever and adapted to be thrown into operation whereby the cutter bar will be raised, means for actuating the lever from the seat of the mowing machine or from a point in advance of and not within reach of an operator of the mower, foot operated means for controlling said power device, and a connection leading from said foot operated means for controlling the same from said point.

5. The combination with a mowing machine having a frame, a cutter bar pivoted to be raised and lowered, an axle having a housing, drive wheels for the axle, bearings on the housing, a shaft journaled in said bearings, means of connection between the shaft and the cutter bar for raising the latter on the rotation of the shaft, means for driving the shaft from the wheels, means for raising and lowering the cutter bar or releasing the actuating means thereof from a point in advance of and not within reach of an operator of the mower, a lever pivoted on the housing for throwing the drive connection into and out of operation, and a forwardly extending connection for operating the latter from said point.

6. The combination with a mowing machine having a frame, a cutter bar pivoted to be raised and lowered, an axle having a housing, drive wheels for the axle, bearings on the housing, a shaft journaled in said bearings, a throw lever for actuating the bar manually and having a latch device for holding the same against movement, means for releasing said latch device from a point in advance of and not within reach of an operator of the mower, intermittent drive connections between the drive wheels and the shaft, a connection between the throw lever and the shaft for exerting pull on the lever to raise the cutter bar, and means for throwing said drive means into operation.

7. The combination with a mowing machine, having a frame, a cutter bar pivoted to be raised and lowered, an axle having a housing, drive wheels for the axle, bearings on the housing, a shaft journaled in said bearings, a throw lever for actuating the bar manually and having a latch device for holding the same against movement, means for releasing said latch device from a point in advance of and not within reach of an operator of the mower, intermittent drive connections between the drive wheels and the shaft, a connection between the throw lever and the shaft for exerting pull on the lever to raise the cutter bar, and means normally disengaging said drive means, a lever pivoted to the housing and having connection with the shaft for rendering the drive means operative by imparting a sliding movement to the shaft, said lever being adapted to be operated directly, and means for operating said lever from said point.

8. The combination with a mowing machine, having a cutter bar adapted to be raised to an inoperative position; of power operated means driven from a wheel thereof for raising said cutter bar, said means having limited operative movement, and means including intermeshing gears, one of which is mutilated for automatically disengaging said means at the limit of said movement.

CHARLES ROBERT KEAGLE.